United States Patent Office 3,116,346
Patented Dec. 31, 1963

3,116,346
ALKYLATION PROCESS
Ross E. Van Dyke, Orinda, Calif., assignor to Shell Oil Company, New York, N.Y., a corporation of Delaware
No Drawing. Filed Apr. 29, 1960, Ser. No. 25,524
10 Claims. (Cl. 260—683.63)

This invention relates to a process for alkylating isoparaffins with olefins in the presence of an acid catalyst containing a solid cation exchange resin. More particularly, this invention relates to a process of alkylating isoparaffins with olefins in the presence of concentrated sulfuric acid containing specially prepared cation exchange resins.

It is well known to prepare high-octane gasoline components by alkylating isoparaffins with olefins in the presence of an acid catalyst. Concentrated sulfuric acid is known to be one of the most practical and effective catalyst for this reaction and to give desired good yields when it is maintained relatively pure. The process has been used extensively in commercial practice for over the past twenty years. A modern version of it is described, for example, in Petroleum Refiner, 35, No. 9, 251 (1956).

It is an object of this invention to provide an improvement in alkylation processes. It is a further object to provide an improved alkylation catalyst of the sulfuric acid type. It is a further object of this invention to provide a method for improving the yield of alkylate. These objects, as well as others, will be better understood from the following description of the invention.

It has been proposed by others to add certain solids to liquid acid alkylation catalysts. For example, the addition of certain metal salts has been proposed to prolong the life of the acid and reduce catalyst consumption. Others have proposed the addition of a solid adsorbent which is inert with respect to the acid catalyst and which is characterized by a high surface area per unit of volume, in order to increase the surface of contact between the acid catalyst and the reacting hydrocarbons. The solid could be employed in the form of granules, pellets, powder or other forms, in amounts up to about 10 percent by weight of the final catalyst mass. It has also been proposed to carry out the alkylation of isoparaffins with olefins in the presence of sulfuric acid to which has been added a sulfonic acid as an alkylation promoter.

In an extended study of the effect of adding a variety of solids and some liquids to concentrated sulfuric acid catalyst in the alkylation of isoparaffins with olefins, it has been found that many solids exert no detectable influence whatsoever on the alkylation reaction when added to sulfuric acid in concentrations of 1.0% by weight or less and that some sulfonated liquids and sulfonic acids actually exert an adverse effect on the alkylation. It has been further found that certain specially prepared sulfonated aryl synthetic cation exchange resins, described in more detail hereinafter, when used in the concentrated sulfuric acid result in a substantially superior alkylation process when compared to using sulfuric acid of the same strength without the additive under otherwise equal conditions. The use of the resin additive in accordance with this invention results in (1) a higher yield of alkylate and (2) an increase in selectivity toward hydrocarbons in the light alkylate boiling range. In operating according to this invention, therefore, the yield of light alkylate is greater than in alkylation with pure sulfuric acid as the catalyst. "Light alkylate" refers to the alkylation product comprising $C_6$ through $C_{10}$ hydrocarbons.

The objects of this invention are accomplished by contacting an isoparaffin feed, preferably isobutane, with olefins having from three to five carbon atoms per molecule, preferably butylenes, at conventional alkylation conditions in the presence of a concentrated sulfuric acid catalyst containing a minor amount of a solid sulfonated aryl synthetic cation exchange resin.

Sulfonated aryl synthetic cation exchange resins are well known and have been proposed as catalysts for a number of chemical reactions, including olefin hydration, alcohol dehydration, ester hydrolysis, and the like. It has heretofore been found that these acid resins have little or no activity as catalysts for the alkylation of hydrocarbons. The apparent explanation of these differences in catalytic activity is that to be an effective catalyst, the acid resin must be in a swollen state, so that the acid sites therein will be on the surface of the resin, and thus available to contact the reactants. The resins normally do not exist in the swollen state, but do so in the presence of a hydroxy solvent. Thus, all of the reactions cited above wherein the acid resins have shown catalytic activity, have involved at least one hydroxy solvent. In reactions such as alkylation of isoparaffins with olefins, neither of which are hydroxy compounds, the acid resins have not shown activity as catalysts for those reactions.

The acid resins of the invention, heretofore ineffective in an alkylation reaction, surprisingly have been found to exhibit a highly beneficial effect upon the alkylation reaction when added in a minor concentration to the concentrated mineral acid conventionally used as alkylation catalyst. The exact manner in which these resins effect the alkylation reaction is not known. It is believed the effect of the resins is not merely due to the availability of added surface, because the addition of other solids in similar concentrations does not improve the performance of the acid under conditions at which the present additive showed substantial improvement. Moreover, substantial variations in surface area of the resins of the invention seem to have no appreciable effect on alkylation results. Actually the composite resin additives have a surface area which is considerably lower than the support used. For example, a Barnaby-Cheney UT-2 activated carbon having a surface area of 1100 $m.^2/gm.$ was used as a support for polydivinylbenzene (14 ml. DVB/100 gm. carbon). The resulting additive, sulfonated with chlorosulfonic acid, had a surface area of 85 $m.^2/gm.$ and, when added to sulfuric acid alkylation catalyst, gave superior results in alkylate yield and selectivity compared to the use of sulfuric acid alone. The improved selectivity toward hydrocarbons in the light alkylate boiling range would indicate the retarding of side reactions and it may be the resins are improving solubility of isobutane in the acid and therefore improving contact of the isobutane with olefin in the acid. The improved yield of alkylate may improve emulsification in the system which eliminates limitations of mass transfer between phases which might exist in the absence of the additives. Such postulations, however, are not to be construed as limiting the scope of this invention.

The acid resins of the additive of this invention are generically defined as sulfonated aryl synthetic cation exchange resins. They are characterized by a polymeric structure containing predominantly aromatic structural moieties and also containing a plurality of sulfonic acid groups bonded directly to those aromatic moieties. The resin can be used as is but is preferably supported on a carrier such as silica gel or activated carbon. Supported resins give somewhat better results than the resin alone and are particularly preferred. Resins supported on activated carbon are highly effective additives and are especially preferred. The difference between the supported resin and the resin alone is thought to be due in part to the fact that impregnation of the resin upon and in the deactivated carbon "freezes" the resin into a psuedo swollen state, in which the active sites are exposed upon the surface of the resin. If desired, the resin may be in the form of a metal salt, such as sodium, copper, or silver salt of the resin although preferably in such case it contains free sulfonic acid groups.

Resins suitable for the additive of the present invention include the solid cross-linked polymers of vinyl aromatic compounds, such as the monovinyl aromatic compounds, or cross-linked copolymers of the monovinyl aromatic compounds with other monoethylenically unsaturated compounds, such as isobutylene, acrylonitrile, acrylamide, and their homologs, alkyl acrylates, alkyl methacrylates, and the like. The required degree of cross-linking is obtained, in the case of the monovinyl aromatic compounds, by regulating the amount of a monomeric hydrocarbon containing two non-conjugated ethylenic linkages (such as p-divinylbenzene), which is copolymerized with the monomeric monovinyl aromatic compound.

By monovinyl aromatic compound it is meant any compound in which a single vinyl group is bonded directly to a ring carbon atom of an aromatic compound. Included in this class are: styrene, vinyl toluene (p-methyl styrene), p-ethyl styrene, the dimethyl styrenes, p-halostyrenes, dihalostyrenes, vinyl naphthalene, and the like. Where the monovinyl aromatic compounds of this class contain a nuclear substituent group other than the vinyl group, it is preferred that the vinyl group be attached to a ring carbon atom in the para position relative to the carbon atom of the ring to which that other substituent group is attached.

As the compound containing two non-conjugated ethylenic linkages used to provide the necessary cross-linking, there preferably is used a polyvinyl aromatic compound, which term includes the divinyl benzenes, divinyl toluene, divinyl xylene, divinyl ethylbenzene, divinyl halobenzenes, and the like. The divinyl aromatic compounds, particularly those wherein the two vinyl groups are in para-configuration relative to each other are preferred. Also suitable as the non-conjugated diolefins are the divinyl ethers, and the like.

The character of the suitable monovinyl aromatic compounds and suitable polyvinyl aromatic compounds is clearly set out in U.S. Patent No. 2,366,007.

The polymers suitable for this invention are those containing at least 2% of cross-linking, that is, the suitable polymers are those which contain at least 2% by weight of the cross-linking agent. Any combination of the monoethylenically unsaturated compound and the non-conjugated diolefinically unsaturated compound containing more than about 2% by weight of the latter will sulfonate to give a composite additive of the stability and level of catalytic activity characteristic of an additive of this invention. Suitable resin additives of this invention may be prepared from polymers containing from about 2% by weight up to 100% by weight of the non-conjugated diolefin. Normally suitable resin additives are prepared from copolymers containing from about 4% up to about 80% by weight of the non-conjugated diolefins. Especially preferred resin additives are prepared from polymers containing about 4% to 20% of the non-conjugated diolefins.

Suitable as the activated carbon support for the resin additive of this invention are any of the amorphous carbons which, because of the method by which they were prepared or because of subsequent treatment, have high absorptive power. The term "activated carbon" has its usually accepted meaning, as set out in chapters 1 and 2 of Hassler, "Active Carbon," Chemical Publishing Company, 1951. The nature of activated carbon and various methods for preparing the material are set out in detail in chapter 2 of this reference. Activated carbon is available commercially under various trade names. A preferred activated carbon available commercially is known under the trade name Barnaby-Cheney UT–2 carbon.

The activated carbon supported resins, additives of this invention, are composited by first calcining the activated carbon at an elevated temperature in an atmosphere containing molecular oxygen, and then impregnating the calcined carbon with a solution of a monomeric compound or mixture of monomeric compounds in a suitable solvent, heating the impregnated carbon to evaporate the solvent, continuing heating to effect polymerization of the monomeric compound, and sulfonating the resulting polymer-impregnated carbon. Precalcination of the activated carbon support results in an activation or oxidation of the surface which aids in the retention of the sulfonated polymer on the support. Calcination of the support in nitrogen prior to impregnation, polymerization and sulfonation results in a composite additive which retains only a small amount of surface acidity.

Any low boiling organic liquid which is a good solvent for the monomeric compound and which is inert with respect to it is suitable for the impregnation. The solvent should boil at a sufficiently low temperature to permit its ready removal from the activated carbon after impregnation with the monomeric solution. Because of their wide availability, and their desirable properties from the standpoint of solvent power for the monomeric compound, inertness, and ease of removal from the impregnated catalyst, the lower alkanes which are liquid or are readily liquified at ordinary room temperatures are preferred. Particularly preferred are the alkanes from propane to decane ($C_3$ through $C_{10}$) including the isomeric forms thereof.

Impregnation of the activated carbon with solution of polymeric compound is effected by simply immersing the activated carbon in the solution and then draining the impregnated carbon when the carbon has absorbed all of the solution it can absorb. To simplify recovery of the impregnated carbon, it is often convenient to use a volume of solution just equal to the maximum amount of that solution which the amount of carbon used is capable of absorbing. This technique results in a "dry" impregnated carbon i.e., no free unabsorbed solution is finally present, which avoids a process step involving separation of impregnated carbon (solid) from the liquid solution.

The amount of polymeric material used, relative to the amount of the carbon, preferably is sufficient to fill from about 20% to about 80% of the pore volume of the carbon. More especially preferred additives are those wherein about 30% to about 70% of the pore volume of the carbon is filled with monomer. Generally it will be found undesirable to use a smaller proportion of the polymeric material. When more than about 80% of the pore volume is filled with polymeric material, activity of the additive is reduced. The reason for this loss of activity at high monomer content is not known. It is possible that with such a large amount of polymeric material in the pore space, many of the exchange sites are unavailable particularly after the resin particles have swelled. Moreover, excessive filling of the pores with swelled resin could impose limitations on diffusion into the pores and thereby reduce catalysis within the pores. It may also be possible that some of the resin is lost as a result of resin particles "popping out" of the pores of the support as they become swelled. The amount of the polymeric material impregnated upon the carbon is easily governed by controlling the amount of polymeric compound in the solution used to impregnate the carbon. Thus, the more dilute the solution of monomeric compound, the less the amount of polymeric material impregnated upon the carbon; and the more concentrated the solution of monomeric compound, the greater the amount of polymeric material impregnated upon the carbon. In general, the only requirement is that the solution be essentially fluid, regardless of the concentration of the monomeric compound therein.

If desired, a polymerization catalyst may be included in the solution of the monomeric compound to speed the polymerization. Suitable catalysts are well known in the art; the most popular are the oxygen-yielding compounds, such as the peroxides (e.g., benzoyl peroxide or ditertiary-butyl peroxide), the persulfates (e.g., ammonium or potassium persulfate), the perchlorates (e.g., sodium perchlorate), the perborates (e.g., sodium perborate), ozone and the ozonides (e.g., olefin ozonides).

Following impregnation of the activated carbon, the carbon is separated from the solution of monomeric compound, if any excess solution is present, and the drained carbon is heated at low temperature (below about 100° C.) for a sufficient time to effect removal of substantially all of the solvent, and then is heated to a temperature of about 100 to 150° C. for a sufficient time to effect polymerization of the monomeric compound. In some cases it may be found convenient and effective to simply heat the drained monomeric impregnated carbon slowly up to about 100 to 150° C. at such a rate that the solvent is substantially all removed by the time that the carbon is about 100° C., and maintaining the temperature until the polymerization is complete.

Sulfonation of the resulting polymer-impregnated carbon is effected by any of the methods known to the art for effecting sulfonation of the polymeric material alone. Suitable sulfonation agents include sulfur trioxide, oleum (fuming sulfuric acid or, equivalently, sulfur trioxide dissolved in sulfuric acid), chlorosulfonic acid, or the like. An excess of the sulfonation agent is used. Depending upon the particular material used to effect sulfonation, the temperature used to effect sulfonation may be in the range of from about −20° C. to about +200° C. The preferred sulfonating agent is chlorosulfonic acid, and the preferred temperature is from about −10° C. to about +50° C. The sulfonation is conducted so as to introduce from about 0.2 to about 3, and preferably from about 0.5 to about 2, sulfonic acid radicals per aromatic nucleus of the polymeric material. This degree of sulfonation will be effected in as little as a few minutes, or may require as much as several hours contact time between sulfonating agent and the polymer-impregnated carbon, the time of contact depending upon the nature of the sulfonating agent and the sulfonation temperature used. The sulfonated composite material is recovered from the reaction mixture by known methods including, where appropriate, vaporization of excess sulfonating agents, decantation of excess liquid sulfonating agents, filtration, centrifugation, or the like, following dilution and/or neutralization of the excess sulfonating agent. Where chlorosulfonic acid is used as the sulfonating agent, it is preferred that the excess chlorosulfonic acid be removed by decomposition with a lower alkanol, such as isopropyl alcohol, followed by washing of the sulfonated composite material with the alkanol, and then with a liquid hydrocarbon, such as benzene. The washed composite material then is dried to give the composite additive.

Just prior to the use of the composite additive it is desirable to heat it at a temperature of at least about 105° C. to remove any water absorbed thereon. The heating should not be conducted at a temperature above about 200° C., since the polymeric material of the composite additive tends to decompose at such higher temperatures. Preferably, the heating is conducted at a temperature of about 110° C. to about 150° C. The composite additives of this invention are those which have a surface area of at least 20 square meters per gram and which have a porosity of at least 0.01 cubic centimeters per gram. The additives of this class which have been found to exhibit good activity are those which have a porosity of about 0.01 to about 0.15 cubic centimeter per gram and those additives having a porosity of from about 0.04 to about 0.08 cubic centimeter per gram are particularly effective for promoting the alkylation of hydrocarbons. The composite additives used in this invention can range in particle size between about one micron and about 250 mesh. Particle size of the additive is not of great criticality as regards the activity of the additive in the system. Practical considerations will govern the particular particle size in a particular system.

The acid resin additive is added to the acid alkylation catalyst in sufficient amount to produce an acid containing from 0.1% to 3.0% by weight, and preferably from 0.1% to 1.0% by weight, of the additive material. A more especially preferred concentration of additive in the acid is from 0.2% to 0.5% by weight. The acid employed as catalyst in the alkylation reactor preferably is concentrated sulfuric acid having a titratable acidity in the range of about 85% to 100% $H_2SO_4$. It is general practice to charge to the process a sulfuric acid having between 96% and 100% concentration and to use it until its titratable acidity has dropped to a lower value, e.g., about 85% to 90%.

A variety of isoparaffins may be alkylated by the process, but the preferred one is isobutane. The isobutane may be present in a feed fraction containing only isobutane or containing isobutane and other paraffins e.g., some propane and normal butane. Isopentane can also be employed as feed. The desired isoparaffin can be alkylated, either singly or in admixture with other compounds, which may be inert under the reaction conditions or which may undergo simultaneous alkylation or other reaction which does not interfere with the process.

Olefins are employed as alkylating agents in this invention. The preferred olefins are the butylenes, i.e., butene-1, butene-2 and isobutylene; a mixed butane-butylene stream containing normal butylenes and isobutylene is often employed. Propylene or amylenes can also be employed as an alkylating agent, although they tend to result in higher acid consumption and lower alkylate quality. Instead of the olefins themselves, polymers thereof, as for example diisobutylene, may be employed as the alkylating agent.

The alkylation reaction in accordance with this invention is carried out at conventional alkylation conditions, including temperatures in the range of from about 35° to about 70° F. and preferably from 40° to 45° F., and pressures in the range of from atmospheric to 135 p.s.i.g., but sufficiently high to maintain the reactants in a liquid phase. It is generally desirable to employ a volume of liquid catalyst phase equal to from about 50% to about 200% and preferably from about 60% to about 150% of the volume of the hydrocarbon phase used. An acid/hydrocarbon volume ratio of about 1/1 is particularly suitable. It is advantageous to use a substantial excess of isoparaffin over the amount of olefinic alkylating agent. Thus, the external ratio of isobutane/olefins is preferably at least 2/1 and more preferably between 5/1 and 20/1.

The following examples are illustrative of the invention and are not to be considered as a limitation thereof.

EXAMPLE I

A number of supported cation exchange resins were prepared to study the influence of amount of polymer in the pore space and of sulfonating conditions on the acidity of the resulting solid. For this study a commercially available silica gel (Davison grade 70) was used as the support. The silica gel was calcined in air and then impregnated with a pentane solution of styrene, divinyl benzene and ditertiary-butyl peroxide (in weight proportions of 90, 10 and 3, respectively). The monomer and polymerization catalyst were dissolved in sufficient n-pentane to fill the pore volume of the support. After impregnation the sample was heated slowly to 100–150° C. to complete the polymerization and expel the pentane solvent. The sulfonation reaction was carried out with chlorosulfonic acid followed by washing with isopropyl alcohol to free the surface of unreacted sulfonating reagent. The resulting solid acid was then washed with benzene and dried in nitrogen at 80° C. In the sulfonation reaction significant amounts of colloidal carbonaceous material were generated so the washing procedure was continued until this colloidal material was removed as shown by the color of the washing liquid.

The supported resins gave acid titres in hydrocarbon media which are equivalent to or better than those in hydroxylic solvents. This is shown in Table I where the exchange capacity or acidity of the sulfonated resins in benzene and methanol are compared.

*Table I*

PROPERTIES OF POLYSTYRENE CATION EXCHANGE RESINS SUPPORTED ON SILICA GEL

| Catalyst No. | Support | Ml. Styrene + DVB per 100 gm. Support | Acid Titre (meq./gm.) | |
|---|---|---|---|---|
| | | | KoH in [a] $CH_3OH$ | n-Butylamine [b] in $C_6H_6$ |
| 3576-177 | Grade 70 | 55 | 1.54 | 1.76 |
| 3576-182A | do | 17 | 0.34 | 0.72 |
| 3576-189 | do | 33 | 0.41 | 1.05 |
| 3576-200 | do | 33 | 0.63 | 1.65 |
| 3576-197A | do | 55 | 0.46 | 1.50 |
| 3576-187 | do | 83 | 0.49 | 0.68 |
| 3576-185A | do | 55 | 0.37 | 1.15 |

[a] Titration with phenolphthalein as indicator.
[b] Titration with benzeneazodiphenylamine as indicator.

EXAMPLE II

A number of cation exchange resins supported on activated carbon were prepared by a procedure essentially the same as that for the silica-supported resins. The resins were copolymers of styrene and divinylbenzene (DVB). The activated carbon support was calcined in air at 565° C. and then impregnated with the mixed monomer dissolved in normal pentane. The monomer used was equivalent in volume to 40-60% of the pore volume of the support. The polymerization, sulfonation, and wash treatments were accomplished as outlined in Example I. Titrations were carried out in methanol using the color change of phenolphthalein as the end point indicator. Titrations were not made in benzene because of the inability to observe color changes. As shown by the data in Table II, the exchange capacity of these materials in methanol were somewhat higher than for the silica-supported resins.

EXAMPLE III

Another series of cation exchange resins supported on activated carbon were prepared by the polymerization of divinylbenzene rather than with mixed monomers of styrene and divinylbenzene. The resins were prepared according to the procedure given in Example I. The data in the following Table III show that these sulfonated polydivinylbenzene resins also have good acidity.

*Table II*

PROPERTIES OF POLYSTYRENE CATION EXCHANGE SUPPORTED ON ACTIVATED CARBON

| Catalyst No. | Support | Ml. Styrene + DVB per 100 gm. Support | $S_s$ m.$^2$/gm. Support | $S_s$ m.$^2$/gm. Catalyst | Acid Titre, meq./gm. KOH in $CH_3OH$ |
|---|---|---|---|---|---|
| 4595-16 | Barnaby-Cheney Carbon UT-2 (50-150 mesh). | 22 | 1,100 | 84 | 1.6 |
| 4595-22 | do | 23 | 1,100 | 48 | 1.5-2.4 |
| 4595-23 | do | 22 | 1,100 | 53 | 1.2 |
| 4595-43 | do | 38 | 1,100 | 30 | 0.7 |
| 4595-39 | do | 76 | 1,100 | | 0.8 |
| 4595-56 | Barnaby-Cheney Carbon UW-2 (50-150 mesh). | 38 | 1,560 | | 0.9 |
| 4595-47 | do | [a] 38 | 1,560 | | 2.0 |
| 4595-49 | Barnaby-Cheney Carbon UW-2 (50-150 mesh).[b] | [a] 38 | 1,560 | | 0.4 |
| 4595-71 | Barnaby-Cheney Carbon XW-2 (100-325 mesh). | 38 | 1,520 | | 2.1 |

[a] 33.6 ml styrene + 4.8 ml. DVB/100 gm. support.
[b] Calcined in an atmosphere of nitrogen.

*Table III*

PROPERTIES OF POLYDIVINYLBENZENE CATION EXCHANGE RESINS SUPPORTED ON ACTIVATED CARBON

| Catalyst No. | Support | Ml. DVB/ 100 gm. Carbon | Surface Area [c] Cat., m.$^2$/gm. | $V_p$, Cat.,[d] cc./gm. | Acid Titre, meq./gm. KOH in $CH_3OH$ |
|---|---|---|---|---|---|
| 4595-172 | Barnaby-Cheney Carbon [a] UT-2. | 9.5 | 500 | 0.18 | 1.02 |
| 4595-168 | do.[a] | 14.3 | 85 | 0.06 | 1.63 |
| 4595-181 | do.[a] | 17.0 | 83 | 0.06 | |
| 4595-183 | do.[a] | 21.0 | 29 | 0.04 | |
| 4595-164 | do.[a] | 34.6 | 11 | 0.01 | 0.49 |
| 4595-159 | do.[a] | 36.3 | 9 | 0.01 | 0.48 |
| 4595-169 | Barnaby-Cheney Carbon [b] PG-2. | 8.0 | 214 | 0.12 | 1.04 |
| 4595-163 | do.[b] | 11.5 | 50 | 0.04 | 1.01 |

[a] UT-2 carbon support, $S_s$=1100 m.$^2$/gm., $V_p$=0.048 cc./gm.
[b] PG-2 carbon support, $S_s$=950 m.$^2$/gm, $V_p$=0.33 cc./gm.
[c] Surface Areas by nitrogen adsorption.
[d] Pore volumes by $CCl_4$ adsorption.

EXAMPLE IV

A number of cation exchange resins were studied as additives to concentrated sulfuric acid for alkylation catalysts. In preparing the major proportion of these materials the carbon supported polymer was ground to less than 325 mesh particle size prior to sulfonation, which was done with 102% $H_2SO_4$ unless noted otherwise. Sulfonation with 102% $H_2SO_4$ is advantageous when the resin is to be used in sulfuric acid alkylation for the washing step to remove unreacted sulfonating agent ($H_2SO_4$) then becomes unnecessary. The sulfonated resins were used in the alkylation experiments promptly after preparation to avoid any variations in results due to aging. The materials are quite hygroscopic and subsequent calcination of the aged resin to remove adsorbed water does not restore to the resin its original properties.

For convenience of operation in bench scale equipment the alkylation was carried out with isopentane and pentene-1 in an all glass system at 20° C. In all experiments a standard charge of 125.6 gm. $H_2SO_4$, 191 gm. isopentane and 38 gm. pentene-1 was employed. This corresponds to 4.9 moles isopentane/mole olefin and a ratio of 5.3 volumes of hydrocarbon per volume of acid. The hydrocarbons were weighed into an ice water cooled jacketed burette and mixed thoroughly. The mixed hydrocarbons were added to the acid at a constant rate over a period of exactly 30 minutes. The mixture was stirred for an additional 30 minutes prior to phase separation. The mixing was executed with a T-shaped paddle in a 1 liter reaction flask at a rate of approximately 1500 r.p.m. Material balances were in the range of 97–99% of the original hydrocarbon charge. Under these conditions, only trace amounts of unreacted pentene-1 were found in the product. The depentanized alkylate was then washed with alkali and water to determine the $C_6+$ alkylate yield.

Results of the alkylation experiments are given in the following Table IV. The alkylate yield from resin additive supported on "Black Pearls" carbon is low in comparison to sulfuric acid alone and is attributed to poor phase separation or to emulsification of a significant fraction of the alkylate in the acid phase.

*Table IV*

THE INFLUENCE OF SOLID ADDITIVES ON SULFURIC ACID ALKYLATION

Reaction:
125.6 gm. $H_2SO_4$
191.0 gm. isopentane
38.0 gm. pentene-1
Temperature: 20° C.
Mixing rate: Approximately 1500 r.p.m.
Reaction time: 60 minutes

| Experiment No. | Quantity of Additive, gm. | Catalyst Composition | Pore Vol., cc./gm. | Yield, gm. $C_6+$ | Selectivity, Percent $C_6$–$C_{10}$ |
|---|---|---|---|---|---|
| 4907-7 | | 96% $H_2SO_4$ | | 78.7 | 75.0 |
| 4907-74 | | 98.6% $H_2SO_4$ | | 81.4 | 77.2 |
| 4595-124 | 3.5 | 96% $H_2SO_4$ + Polystyrene + DVB on Black Pearls carbon [a] | | 66.9 | 80.7 |
| 4595-127 | 1 | 96% $H_2SO_4$ + Dowex 50 x 8 <400 mesh | | 79.0 | 81.0 |
| 4907-14 | 1.1 | 96% $H_2SO_4$ + Poly DVB on Spheron-9 carbon [b] | 0.62 | 84.9 | 75.6 |
| 4907-54 | 0.25 | 96% $H_2SO_4$ + 11 ml. DVB/100 gm. UT-2 carbon <325 mesh | 0.26 | 80.3 | 79.2 |
| 4907-46 | 0.25 | 96% $H_2SO_4$ + 12 ml. DVB/100 gm. UT-2 carbon <325 mesh | 0.24 | 84.8 | 80.2 |
| 4907-63 | 0.25 | 96% $H_2SO_4$ + 13 ml. DVB/100 gm. UT-2 carbon <325 mesh | 0.23 | 83.9 | 79.0 |
| 4907-57 | 0.25 | 96% $H_2SO_4$ + 14.4 ml. DVB/100 gm. UT-2 carbon <325 mesh | 0.22 | 81.1 | 80.0 |
| 4907-61 | 0.25 | 96% $H_2SO_4$ + 16 ml. DVB/100 gm. UT-2 carbon <325 mesh | 0.20 | 81.6 | 79.0 |
| 4907-77 | 0.25 | 98.6% $H_2SO_4$ + 12 ml. DVB/100 gm. UT-2 carbon <325 mesh | | 85.3 | 80.0 |
| 4907-42 | 0.50 | 96% $H_2SO_4$ + 14 ml. DVB/100 gm. UT-2 carbon <325 mesh [c] | 0.06 | 82.4 | 79.0 |

[a] Cabot Carbon Co. Carbon $S_s$=422 m.²/gm., $V_p$=1.02 cc./gm.
[b] Cabot Carbon Co. Carbon $S_s$=102 m.²/gm., $V_p$=0.68 cc./gm.
[c] Additive sulfonated with chlorosulfonic acid, washed with IPA, benzene and calcined at 150° C. before use.

I claim as my invention:

1. A process for alkylating an isoparaffin having 4 to 5 carbon atoms per molecule with an olefin having from 3 to 5 carbon atoms per molecule which comprises contacting said isoparaffin and olefin under alkylation conditions with concentrated sulfuric acid containing from about 0.1% to about 3% by weight of a solid sulfonated vinyl aryl synthetic cation exchange resin.

2. A process for alkylating isobutane with an olefin having from three to five carbon atoms per molecule which comprises contacting a mixture of said isobutane and olefin under alkylation conditions in the presence of concentrated sulfuric acid containing from about 0.1% to 3% by weight of a solid sulfonated vinyl aryl synthetic cation exchange resin.

3. A process for alkylating an isobutane with an olefin having from three to five carbon atoms per molecule which comprises contacting a mixture of said isobutane and olefin under alkylation conditions with concentrated sulfuric acid containing from about 0.1% to about 3% by weight of a solid sulfonated aryl synthetic cation exchange resin, said resin comprising a sulfonated cross-linked polymer of a monovinyl aryl compound and a polyvinyl aryl compound supported on a porous carrier.

4. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin, said resin comprising a sulfonated cross-linked polymer of styrene and divinyl benzene, said polymer containing at least 2% by weight of divinyl benzene.

5. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin, said resin comprising a sulfonated cross-linked polymer of a monovinyl aryl compound and a polyvinyl aryl compound supported on an activated carbon, said polymer being sulfonated to contain from about 0.5 to about 2 sulfonate radicals per aromatic ring and being present in an amount sufficient to fill from about 20% to about 80% of the pore volume of the activated carbon.

6. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin, said resin comprising a sulfonated cross-linked polymer of divinylbenzene supported on an activated carbon which has been calcined in air, said polymer being sulfonated to contain from about 0.5 to about 2 sulfonate radicals per aromatic ring and being present in an amount sufficient to fill from about 20% to about 80% of the pore volume of the activated carbon.

7. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin having a particle size of from about 1 micron to about 250 mesh, said resin comprising a sulfonated cross-linked polymer of styrene and divinylbenzene, said polymer containing at least 2% by weight of divinylbenzene and being sulfonated to contain from about 0.5 to about 2 sulfonate radicals per aromatic ring.

8. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin having a particle size of from about 1 micron to about 250 mesh, said resin comprising a sulfonated cross-linked polymer of a monovinyl aryl compound and a polyvinyl aryl compound supported on an activated carbon which has been calcined in air, said polymer containing at least 2% by weight of polyvinyl aryl compound and being sulfonated to contain from about 0.5 to about 2 sulfonate radicals per aromatic ring and being present in an amount sufficient to fill from about 20% to about 80% of the pore volume of the activated carbon.

9. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchagne resin having a particle size of from about 1 micron to about 250 mesh, said resin comprising a sulfonated cross-linked polymer of sytrene and divinylbenzene supported on an activated carbon which has been calcined in an atmosphere containing molecular oxygen, said polymer being present in an amount sufficient to fill from about 20% to about 80% of the pore volume of the activated carbon and comprising at least 2% by weight of divinylbenzene and from about 0.5 to about 2 sulfonate radicals per aromatic ring.

10. A process for alkylating isobutane with an olefin having from three to five carbon atoms per molecule which comprises contacting a mixture of said isobutane and olefin under alkylation conditions in the presence of concentrated sulfuric acid containing from about 0.1% to about 3% by weight of a solid sulfonated aryl synthetic cation exchange resin having a particle size of from about 1 micron to about 250 mesh, said resin comprising a sulfonated cross-linked polymer of divinylbenzene supported on activated carbon, said polymer being sulfonated to contain from about 0.5 to about 2 sulfonate radicals per aromatic ring and being present in an amount sufficient to fill from about 20% to about 80% of the pore volume of the activated carbon.

References Cited in the file of this patent

UNITED STATES PATENTS

| | | |
|---|---|---|
| 2,380,234 | Hall | July 10, 1945 |
| 2,434,833 | Ciapetta | Jan. 20, 1948 |
| 2,463,262 | Goldsby | Mar. 1, 1949 |
| 2,480,240 | Harper | Aug. 30, 1949 |
| 2,683,695 | Dwyer | July 13, 1954 |
| 2,802,884 | D'Alelio | Aug. 13, 1957 |
| 2,834,819 | D'Alelio | May 13, 1958 |
| 2,855,371 | Abrams | Oct. 7, 1958 |
| 3,017,441 | Thomas et al. | Jan. 16, 1962 |
| 3,037,052 | Bortnick | May 29, 1962 |

OTHER REFERENCES

Sussman: Industrial and Engineering Chemistry, vol. 38, No. 12, pp. 1228–1230.